Dec. 11, 1923. Re. 15,729

W. H. McGANN

GRAIN DOOR FORCING DEVICE

Original Filed Aug. 30, 1920

INVENTOR.
W. H. McGANN.
BY HIS ATTORNEY.
James F. Williamson

Reissued Dec. 11, 1923. Re. 15,729

UNITED STATES PATENT OFFICE.

WILLIAM H. McGANN, OF MINNEAPOLIS, MINNESOTA.

GRAIN-DOOR-FORCING DEVICE.

Original No. 1,400,447, dated December 13, 1921, Serial No. 407,052, filed August 30, 1920. Reissue No. 15,306, dated March 14, 1922, Serial No. 535,229, filed February 6, 1922. Application for second reissue filed June 1, 1922, Serial No. 565,565. Reissue No. 15,397, dated July 4, 1922. This application for reissue filed May 16, 1923. Serial No. 639,461.

*To all whom it may concern:*

Be it known that I, WILLIAM H. McGANN, a citizen of the United States, residing at Minneapolis, in the county of Hennepin and State of Minnesota, have invented certain new and useful Improvements in Grain-Door-Forcing Devices; and I do hereby declare the following to be a full, clear, and exact description of the invention, such as will enable others skilled in the art to which it appertains to make and use the same.

My invention has for its object to provide a simple and efficient grain door forcing device; and to such ends, generally stated, the invention consists of the novel devices and combinations of devices hereinafter described and defined in the claims.

The invention is illustrated in the accompanying drawings wherein like characters indicate like parts throughout the several views.

Referring to the drawings.

The numeral 4 indicates the floor structure, the numeral 5, one of the side sills, the numeral 6 one of the side door posts, and the numeral 7 the grain door of an ordinary box car.

These grain doors as usually constructed, are made of wood and are usually nailed to the inner sides of the door posts in a position to span the door opening. When grain, or like material, indicated at *y* is loaded in the car against the so-called grain door, the latter can be opened only by forcing the same inward, or by breaking the lumber of the grain door. The customary practice is to break through, or split up the boards of the grain door so that there is a very great loss of lumber in the use of these grain doors, and moreover, the breaking of the grain door is often a quite tedious, difficult, or unsatisfactory operation, even when the proper tool, such as a crowbar, or the like, is available.

Because of the scarcity of pine lumber, it is becoming a more common practice to make these grain doors of cheap grades of hard lumber, and this increases the difficulty of breaking the grain doors open by the customary means, and also increases the desirability of saving as much as possible of the lumber of the grain doors.

Figure 1:
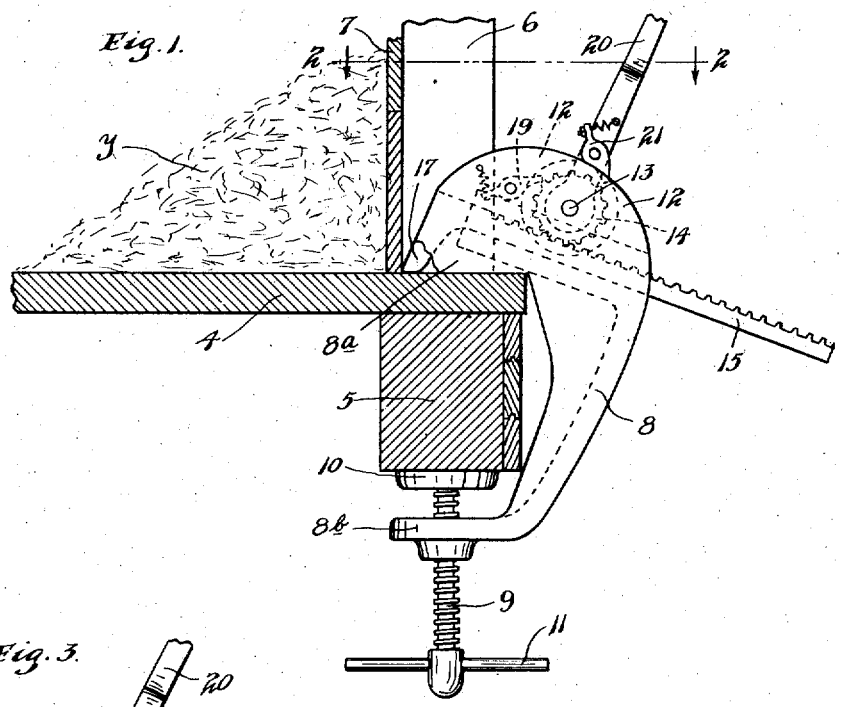
Figure 1 is a fragmentary section of a body of an ordinary box car and grain door and shows the improved forcing device in side elevation, applied in working position.
Figure 3:
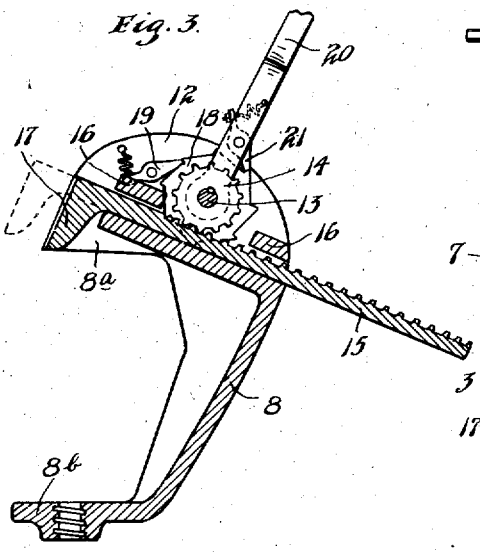
Fig. 3 is a vertical section taken through the forcing device on the line 3—3 of Fig. 2, the same being removed from working position.

The device which I will now describe and which I have termed a grain door forcing device, accomplishes the objects above indicated. Preferably this forcing device is constructed and arranged as follows:

The numeral 8 indicates a very strong cast metal clamp of approximately C-shaped formation, but having parallel, vertically spaced jaws $8^a$ and $8^b$ that are of such size and so spaced that they will embrace the floor structure and side sill at the door opening with the undersurface of the jaw $8^a$ resting upon the floor structure, as best shown in Fig. 1.

The lower jaw $8^b$ is provided with a clamping screw 9 working with threaded engagement therethrough, and provided at its upper end with a swiveled clamping head 10 that is adapted to bear directly against the under surface of the sill 5. At its lower end, the screw 9 has a hand piece 11, by means of which it may be rotated, to very securely anchor the clamp 8 against the side sill and floor structure with its upper jaw in the immediate vicinity of the lower transversely central portion of the grain door.

The upper end portion of the clamp 8 is provided with laterally spaced upstanding flanges 12, in which is journaled a short cross shaft 13 provided at its central portion with a spur pinion 14 keyed, or otherwise, rigidly secured thereto, for rotation therewith.

The numeral 15 indicates a thrust plunger which stands in an oblique position in respect to the grain door, is located directly under the pinion 14, is provided with rack teeth with which said pinion meshes, and is mounted for straight line sliding movement in keepers 16 formed on the inclined upper portion of said clamp 8. At its inner end, the plunger 15 is provided with a head 17, the operative face of which is oblique to the grain door and extends downward from said plunger, so that its lower edge will engage with the extreme lower edge portion of the grain door 7 when the clamp is applied as shown in Figs. 1 and 2.

In this preferred arrangement, the shaft 13 is shown as provided with two ratchet wheels 18 rigidly secured thereto, one on each side of the pinion 14. Spring pressed retaining dogs 19 pivoted to the flanges 12 normally engage the respective ratchet wheels 18.

The numeral 20 indicates a long operating lever having a forked lower end pivotally mounted on the shaft 13 with its prongs immediately inward of the ratchet wheels 18. The prongs of this lever are provided with spring-pressed driving dogs 21 that are engageable with the respective ratchet wheels 18.

Figure 2:
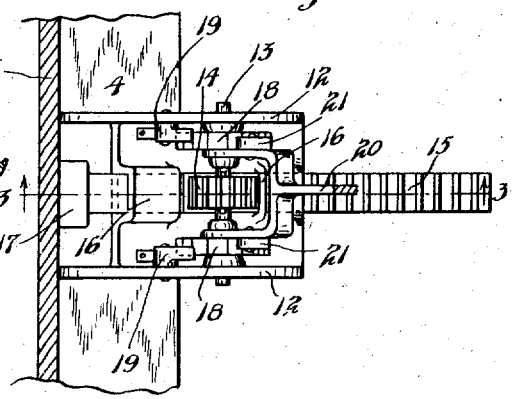
Fig. 2 is a horizontal section taken on the line 2—2 of Fig. 1.

When the forcing device is applied as shown in Figs. 1 and 2, and the lever 20 is oscillated, the plunger 15 will be forced inward against the grain door with a very powerful action, and its head 17, being thus forced against the lower central portion of the door 7 will positively force the same inward with an upward lifting action due to the inclination of the plunger. If the grain door stands this pressure required to effect the initiative opening movement and the initial discharge of grain without breaking, so much the better, but if it does not, it will be only the lower board of the grain door, or a small part of the grain door that would be broken, and much of the grain door will be saved. At any rate, the grain door need not be hacked and knocked to pieces, and frequently a grain door will yield to the steady, even pressure of the forcing device, to permit relief of the grain pressure by effecting an initial discharge of grain, without being broken at all. From what has been said, the great utility of this device, both as to economy and time and saving of lumber is thought to be obvious.

What I claim is:—

1. A grain door forcing device comprising a clamp having means for rigidly securing the same to a side sill and floor structure of a box car with its upper portion exposed in the door opening, a thrust plunger mounted on the upper portion of said clamp for movement therethrough against a grain door applied in the door opening, and a manually operated power multiplying device applied to said clamp and operative on said plunger to force the same against a grain door.

2. A grain door forcing device comprising a clamp having means for rigidly securing the same to a side sill and floor structure of a box car with its upper portion exposed in the door opening, a thrust plunger mounted on the upper portion of said clamp for movement against a grain door applied in the door opening, and a manually operated power multiplying device applied to said clamp and operative on said plunger to force the same against a grain door, the said plunger being mounted for oblique movement and having a depending head at its inner end for direct engagement with the grain door.

3. A grain door forcing device comprising an approximately C-shaped clamp having parallel jaws, the upper jaw being adapted for engagement with the car floor at the door opening thereof, and said lower jaw having a clamping screw for engagement with the under-surface of the car sill, a rack toothed plunger slidably mounted on the upper portion of said clamp and engageable at its inner end with a grain door, a shaft journaled to the upper portion of said clamp and having a spur pinion and a ratchet wheel, said pinion meshing with the rack teeth of said plunger, a retaining dog on said clamp operative on said ratchet wheel, and a lever pivotally associated with said shaft and having a driving dog operative on said ratchet wheel.

4. A grain door forcing device comprising an approximately C-shaped clamp, having parallel jaws, the upper jaw being adapted for engagement with the car floor at the door opening thereof, and said lower jaw having a clamping screw for engagement with the under-surface of the car sill, a rack toothed plunger slidably mounted on the upper portion of said clamp and engageable at its inner end with a grain door, a shaft journaled to the upper portion of said clamp and having a spur pinion and a ratchet wheel, said pinion meshing with the rack teeth of said plunger, a retaining dog on said clamp operative on said ratchet wheel, and a lever pivotally associated with said shaft and having a driving dog operative on said ratchet wheel, the said plunger being mounted to move obliquely to the floor engaging face of the upper jaw of said clamp and having a depending grain door engaging head.

5. A grain door forcing device comprising a clamp having means for securing the same to the floor structure and side sill of a box car, at the door opening thereof, a plunger slidably mounted on the upper portion of said clamp and engageable with a grain door mounted in the door opening, a lever pivotally connected to the upper portion of said clamp, and pawl and ratchet actuated connection between said lever and plunger.

6. A grain door forcing device having in combination a clamp adapted to engage a portion of the car structure to rigidly hold the device in position, means mounted in said clamp adapted to be moved relatively thereto into engagement with the car door, and manually operated means for moving said last named means.

7. A grain door forcing device having in combination, a member adapted to engage the car sill, means connected to said member to hold the same firmly in position, means mounted on said member to move relatively thereto to engage the car door, and means for operating said last named means.

8. A car door opening device having in combination, a member having means for positively supporting the same in stationary position directly in front of said door and at any point along the front thereof, a plunger carried by said member and having means at its forward end to engage a door, said plunger carrying a rack, a gear mounted in said member engaging said rack to move the plunger longitudinally against the door and means for turning said gear to move the plunger against the door.

9. A grain door opening device having in combination, a member having means for positively supporting the same in stationary position at any point along the front of a grain door, a plunger guided in said member for longitudinal movement in a plane substantially at right angles to the plane of said door, said plunger carrying a head for engaging said door and also carrying a rack along one side thereof, a gear engaging said rack to advance said plunger, and means for holding said gear from reverse movement.

10. A car door opening device having in combination, a member having means for positively supporting the same in stationary position directly in front of the car door and at any point along the front thereof, a plunger carried by said member and having means at its forward end to engage said door, means on said plunger and disposed along the same by which it can be moved longitudinally, a member engaging said last mentioned means and co-operating therewith to move said plunger longitudinally, and rotating means for causing said last mentioned member to operate to move said means on said plunger and thus move said plunger longitudinally.

In testimony whereof I affix my signature.

WILLIAM H. McGANN.